US011120033B2

United States Patent
Xu et al.

(10) Patent No.: US 11,120,033 B2
(45) Date of Patent: Sep. 14, 2021

(54) COMPUTER LOG RETRIEVAL BASED ON MULTIVARIATE LOG TIME SERIES

(71) Applicant: NEC Laboratories America, Inc., Princeton, NJ (US)

(72) Inventors: Jianwu Xu, Lawrenceville, NJ (US); Haifeng Chen, Windsor, NJ (US)

(73) Assignee: NEC Corporation

( * ) Notice: Subject to any disclaimer, the term of this patent is extended or adjusted under 35 U.S.C. 154(b) by 259 days.

(21) Appl. No.: 16/400,348

(22) Filed: May 1, 2019

(65) Prior Publication Data

US 2019/0354524 A1    Nov. 21, 2019

Related U.S. Application Data

(60) Provisional application No. 62/672,570, filed on May 16, 2018.

(51) Int. Cl.
| | | |
|---|---|---|
| *G06F 11/07* | (2006.01) | |
| *G06F 16/2458* | (2019.01) | |
| *G06F 16/22* | (2019.01) | |
| *G06F 40/30* | (2020.01) | |
| *G06F 11/34* | (2006.01) | |
| *H04L 12/26* | (2006.01) | |
| *G06N 20/00* | (2019.01) | |

(52) U.S. Cl.
CPC ...... *G06F 16/2477* (2019.01); *G06F 11/0709* (2013.01); *G06F 11/079* (2013.01); *G06F 11/0751* (2013.01); *G06F 11/0778* (2013.01); *G06F 16/2237* (2019.01); *G06F 11/0781* (2013.01); *G06F 11/3476* (2013.01); *G06F 40/30* (2020.01); *G06N 20/00* (2019.01); *H04L 43/04* (2013.01)

(58) Field of Classification Search
CPC .......... G06N 20/00; G06F 21/56; H04L 43/04
See application file for complete search history.

(56) References Cited

U.S. PATENT DOCUMENTS

6,671,683 B2   12/2003   Kanno
7,231,388 B2    6/2007   Matsubayashi et al.
(Continued)

FOREIGN PATENT DOCUMENTS

JP    WO2017094262    *    8/2017

OTHER PUBLICATIONS

Wikipedia's Cosine Similarity historical version published May 10, 2018 https://en.wikipedia.org/w/index.php?title=Cosine_similarity&oldid=840517853 (Year: 2018).*

(Continued)

*Primary Examiner* — Joseph O Schell
(74) *Attorney, Agent, or Firm* — Joseph Kolodka

(57) ABSTRACT

Systems and methods for computer log retrieval are provided. A system can receive a set of query logs, and transform the set of query logs into a query log multivariate time series. The system accesses log multivariate time series of historical logs, and computes and ranks a similarity distance between the query log multivariate time series and each of the log multivariate time series of the historical logs. The system also retrieves a highest ranked set of historical logs as a most similar set of logs compared to the set of query logs.

18 Claims, 13 Drawing Sheets

(56) References Cited

U.S. PATENT DOCUMENTS

| | | | | |
|---|---|---|---|---|
| 8,095,830 | B1* | 1/2012 | Cohen | G06F 11/3082 |
| | | | | 714/45 |
| 9,104,877 | B1* | 8/2015 | Allen | G06F 21/552 |
| 2016/0292592 | A1* | 10/2016 | Patthak | G06F 11/3086 |
| 2017/0132523 | A1* | 5/2017 | Zhang | G06N 5/047 |
| 2017/0251003 | A1* | 8/2017 | Rostami-Hesarsorkh | |
| | | | | H04L 63/1425 |
| 2018/0052892 | A1* | 2/2018 | Cho | G16H 10/60 |
| 2018/0060314 | A1 | 3/2018 | Xu et al. | |
| 2018/0129579 | A1* | 5/2018 | Debnath | G06F 11/0775 |
| 2018/0349801 | A1* | 12/2018 | Togawa | G06F 11/07 |
| 2019/0034517 | A1* | 1/2019 | Byrd | G06F 17/40 |
| 2020/0184072 | A1* | 6/2020 | Ikeda | G06N 20/00 |

OTHER PUBLICATIONS

Smuelders, Content-Based Image Retrieval at the End of the Early Years, IEEE Transactions on Pattern and Machine Intelligence, vol. 22, Issue 12, Dec. 2000, pp. 1349-1380.

Hamooni, "LogMine: Fast Pattern Recognition for Log Analytics", Proceedings of the 25th ACM International Conference on Information and Knowledge Management, Oct. 2016, pp. 1573-1582.

Ning, "HLAer: A System for Heterogeneous Log Analysis", SMD Workshop on Heterogeneous Learning, Jul. 2014, 22 pages.

Zyrtax, http://www.zytrax.com/tech/web/regex.htm, Jul. 2018, 32 pages.

Smith, "Identification of Common Molecular Subsequences", Journal of Molecular Biology, vol. 147, No. 2, Mar. 1981, pp. 195-197.

Sokal, "A Statistical Method for Evaluating Systematic Relationships", University of Kansas Science Bulletin, vol. 28, Aug. 2011, pp. 1409-1438.

Logstash, https://www.elastic.co/products/logstash, Mar. 2019, 16 pages.

Elasticsearch, https://www.elastic.co/products/elasticsearch, Mar. 2019, 17 pages.

Java Software from Oracle, https://www.oracle.com/java/index.html, Mar. 2019, 4 pages.

* cited by examiner

COMPUTER LOG RETRIEVAL BASED ON MULTIVARIATE LOG TIME SERIES

RELATED APPLICATION INFORMATION

This application claims priority to U.S. Provisional Patent Application No. 62/672,570, filed on May 16, 2018, incorporated herein by reference herein its entirety.

BACKGROUND

Technical Field

The present invention relates to computer software logs and more particularly to the analysis and retrieval of computer software logs.

Description of the Related Art

In log-based system maintenance and monitoring management technology, computer software logs are generated and used for analysis and retrieval. One of the challenges of system maintenance and monitoring management is to quickly and reliably retrieve similar logs from huge amount of heterogeneous operation logs based on a segment of selected query log. When system anomalies occur, it is important to automatically detect the anomaly and alert system administrators. Rapid and efficient retrieval is particularly useful in system fault diagnosis and recovery when administrators would like to compare the current failure event with previous similar ones to help diagnose failures.

SUMMARY

According to an aspect of the present invention, a method is provided for computer log retrieval. The method includes parsing each log of a set of logs against a model database. The parsing includes applying a clustering process and pattern recognition to unparsed logs from the set of logs to produce new log formats. The method includes frequency counting for each log format of the set of logs to obtain single time series. The method also includes forming multivariate time series from the single time series according to log message frequencies within a selected time resolution for each log format in the set of logs. The method includes obtaining a time series signature for the set of logs based on the multivariate time series. The method further includes storing and indexing the time series signature in the model database in a query accessible format.

According to another aspect of the present invention, a method is provided for computer log retrieval. The method includes receiving a set of query logs, and transforming the set of query logs into a query log multi-variate time series. The method also includes accessing log multivariate time series of historical logs, and computing and ranking a similarity distance between the query log multivariate time series and the log multivariate time series of the historical logs. The method includes retrieving a highest ranked set of historical logs as a most similar set of logs compared to the set of query logs.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
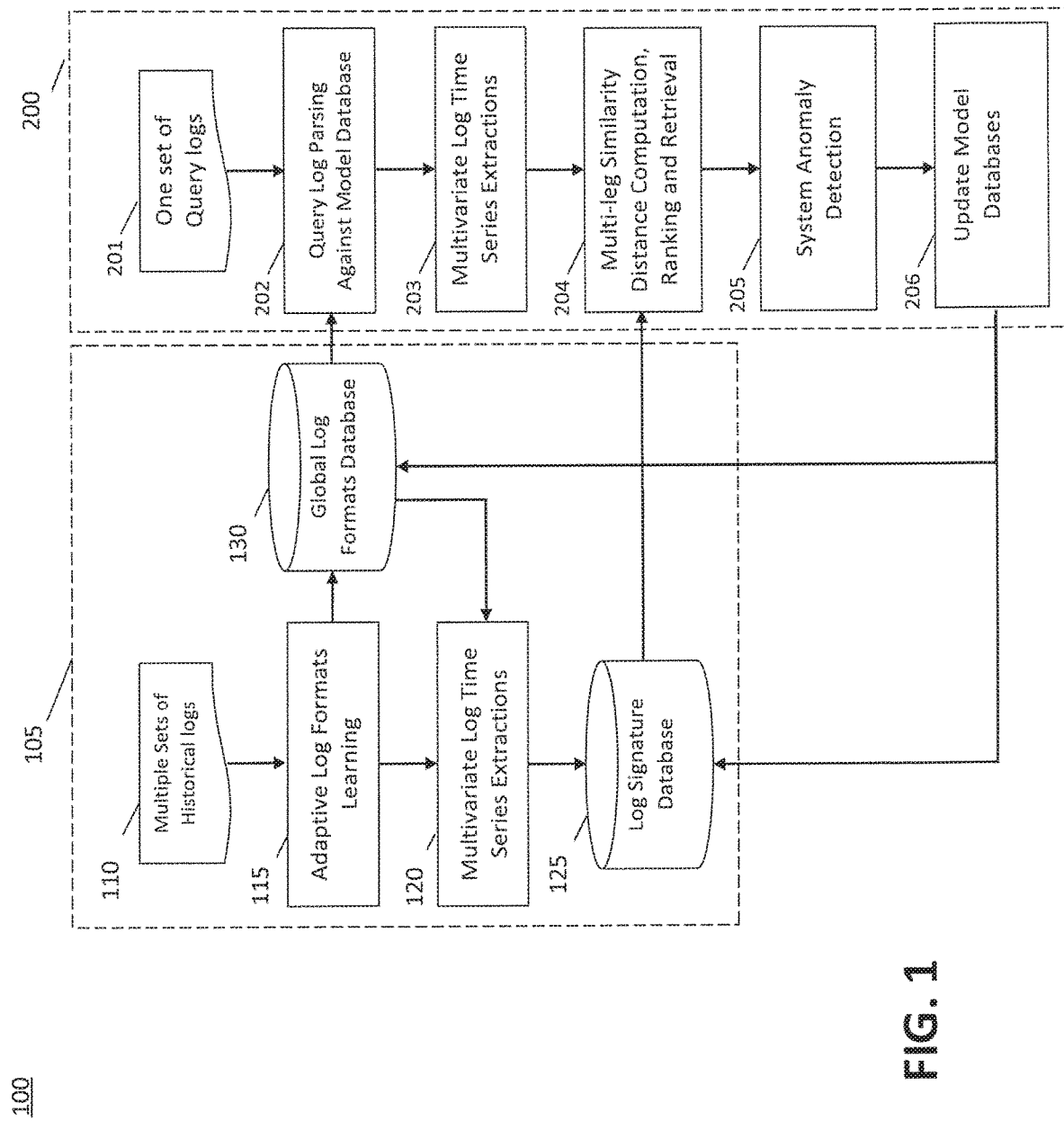
FIG. 1 is a schematic and block diagram illustrating a high-level system for computer log retrieval and anomaly detection based on multivariate log time series in accordance with an embodiment of the present invention, in accordance with the present invention.

In accordance with the present invention, systems and methods are provided for (for example, system anomaly detection by) automatically retrieving a set of most similar logs from a historical database based on a set of query logs. The similarity of the logs is defined as a log format multivariate time series similarity for any two (or more) sets of logs. If the similarity distance between the query logs and the most similar logs exceeds certain threshold, then a system anomaly is detected.

Example embodiments characterize the log messages from a system dynamics perspective. Log messages are generated during the execution of different software components in different processes. The inter-relationship of different software component is reflected in the aggregated log messages which describes the locations, time stamps and before and after relationship of log messages. When the multivariate log format time series are extracted from the log messages, the system dynamics are embedded in the multivariate time series because they characterize the log message frequencies along the time. The retrieved set of logs are presented to the system administrators for comparison against the query logs with the extracted statistics for understanding and summarization. The statistics include the log message counts for each log format and similarity between the query logs and retrieved logs in the database. The statistics of log messages can be used in diagnosing system faults.

In one embodiment, the systems and methods efficiently and robustly retrieve computer logs based on received query logs. The system extracts multivariate time series for each of the log formats within each set of historical logs. Each log format corresponds to one log generating regular expression which is to be mapped to multiple log messages. Because the log generating regular expression represents the syntactic format of logs, multiple log messages with variants in different log message fields can be generated from the same log format. For example, multiple log message with different time stamp values but same content in the rest of message fields can be generated from one log format with time stamp template. The time stamps of each of the log messages are parsed and extracted. Time series are formed according to the log message frequencies within a selected time resolution. Each log template generates a time series. Multiple time series are obtained within each selected set of historical logs. Therefore, the multi-variate time series captures the log system dynamics and becomes the signature of the text logs. The time series signature is stored and indexed in the database for the query purpose. During log retrieval stage, any selected set of query logs can be transformed into a multi-variate time series in a same manner as the training historical logs. Afterwards, similarity distances between the query log multivariate time series and ones from the training historical logs are computed and ranked. The highest ranked set of historical logs will be retrieved as the most similar set of logs compared to the query log.

Embodiments described herein automatically detect system anomalies based on the distance between the testing logs and the retrieved logs. The example embodiments aid system administrators in fault diagnosis and event classification tasks. The embodiments also reduce failure recovery time and can thereby save organizations the cost associated with violation of service level agreements. When a system anomaly occurs, and service breaks down, system administrators are required to quickly recover the system to normal state. The embodiments provide a method for supporting system administrators in fault diagnosis to identify the root cause of the anomaly by retrieving a set of most similar logs in the historical database. The most similar logs correspond to similar system anomaly that have previously been identified. Therefore, system administrators can quickly apply previous solutions to the current system anomaly and solve the issue in a timely manner and reduce failure recovery time. The example embodiments use log dynamic information for retrieving computer logs in a manner of feature representation of logs. The example embodiments capture the system dynamics and relationships among different components by using multivariate log time series. The example embodiments automatically rank the historical logs based on similarity measures and locate the most similar logs based on a provided set of query logs. The example embodiments enable an adaptive learning approach to handle large scale logs.

Once system administrators obtain a set of similar failure incidents from historical logs, they can perform comparative study and search for a potential root cause of failure based on previous diagnosis results. The example embodiments provide a reliable log retrieval method that has more a minimum accuracy of precision and recall. The retrieval precision of the example embodiments prevents false positives being presented to system administrators (and thereby avoids confusing them in their tasks). The systems sets the retrieval recall sufficiently high so that very few true positives will be missed in the retrieved results, and thus enhances the effectiveness of fault diagnosis by system administrators.

As referred to herein below, the designation "(component)" indicates that the numbered component executes the named function. For example, a learning (component) performs a learning process.

Referring now in detail to the figures in which like numerals represent the same or similar elements and initially to FIG. 1, a block diagram illustrating an architecture 100 of multivariate log time series for log retrieval is depicted in accordance with an embodiment of the present invention.

As shown in FIG. 1, the log retrieval architecture 100 provides an overall workflow for similar log retrieval based on multivariate log time series. Log retrieval architecture 100 includes learning stage 105 and anomaly retrieval stage 200.

Learning stage 105 can include multiple components, as shown in FIG. 1. Learning stage 105 includes a multiple sets of historical logs (component) 110, an adaptive log formats learning (component) 115, a multivariate log time series extractions (component) 120, a log signature database 125, and a global log formats database 130. During learning stage 105 (for example, huge amounts of) logs are indexed and organized to form feature vectors. Syntactic log formats are discovered directly from the historical logs and multivariate time series for each log pattern are generated to represent each set of training historical logs. The log dynamics representations are stored in the log signature database for the query stage.

The multiple sets of historical logs (component) 110 assembles (or receives, retrieves, etc.) heterogeneous logs from arbitrary systems or software applications that produce logs to record system events, status or any other information. The heterogeneous logs are transported into architecture 100 (and multiple sets of historical logs (component) 110) via streaming process, message transporter, file transfer, or any appropriate manner of providing logs. Logs contain unstructured text content with one or multiple fields. Logs can contain timestamps to record when an event or printout occurs in the originating system. In log retrieval architecture 100, to facilitate the task of locating a set of continuous logs which are most like (for example, similar to) query logs, multiple sets of historical logs (component) 110 organizes the input historical logs into multiple sets separated by time segments, either by day, or by hour, etc. The time resolution can be set by users based on domain knowledge of underlying system or specific tasks for applying the log retrieval architecture 100. The log retrieval architecture 100 can set a default time resolution based on discovery of the seasonality of logs in instances in which the time resolution parameter is not set by the users. Each set of logs consists of multiple sources. For example, one segment of logs can have database logs, front end application logs, backend application logs, access logs, etc.

Figure 2:
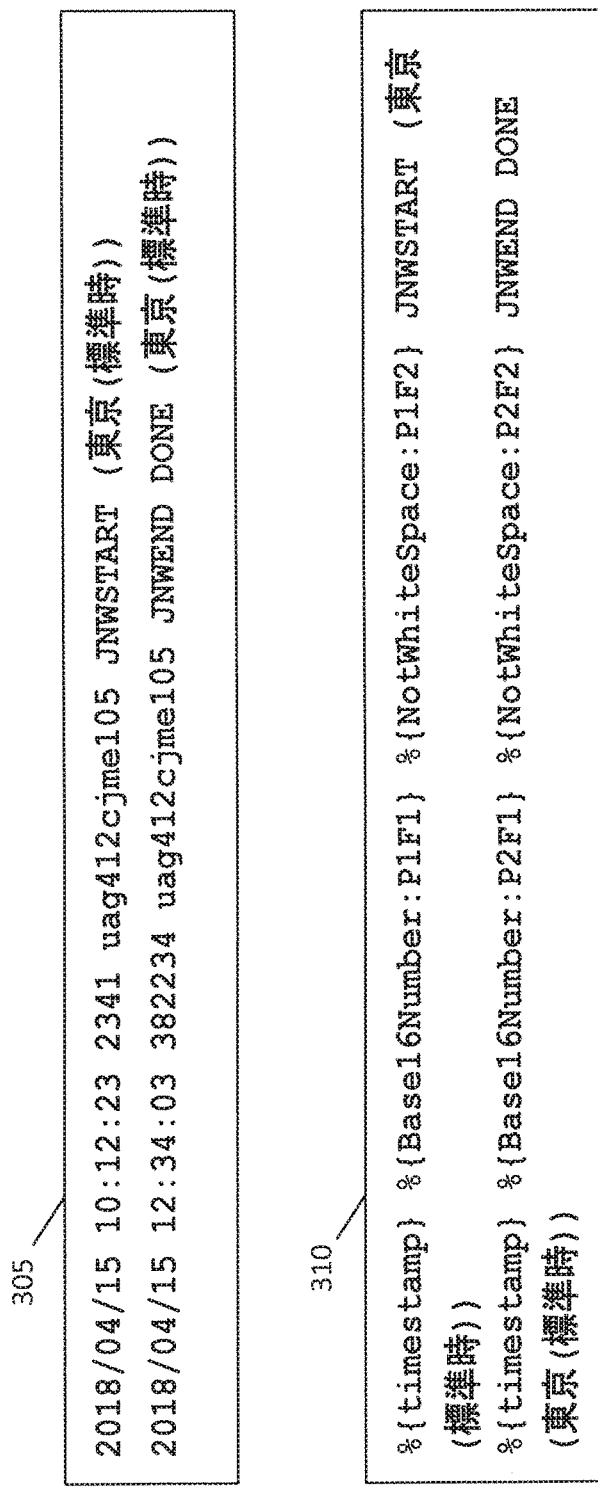
FIG. 2 is an example illustration of logs and corresponding formats, in accordance with the present invention.

Adaptive log formats learning (component) 115 (for example, automatically) generates the log syntactic formats directly from the log messages (for example, without any human supervision). The log format is the syntactic information of any log messages, which corresponds to the print out statements in the software source code. FIG. 2 presents an example with original logs and their corresponding log formats. Adaptive log formats learning (component) 115 is further described herein below with respect to FIG. 3.

As shown in FIG. 2, original logs 305 and corresponding formats 310 are illustratively depicted in accordance with an embodiment of the present invention. The example original logs 305 and the corresponding log formats illustrate that the logs include a time stamp (with a date (e.g., 2018 Apr. 15) and a time (10:12:23)) as well as a base number (illustrated as 2341 and 382234 in original logs 305, base 16number: P1F1 and base 16number:P2F1 in log formats 310), a non-white space character (illustrated as uag412cjme105 (for both) in original logs 305 and NotWhiteSpace:P1F2 and NotWhiteSpace:P2F2 in log formats 310) and their start (JNWSTART) and end (JNWEND DONE) commands (shown with corresponding Japanese script).

System anomalies can include an abnormal log format sequence. For example, with reference to FIG. 2, each log message with "JNWSTART" is completed by another log message with "JNWEND DONE". This represents a complete job schedule sequence starting with a new job and finished in a timely manner. When the multivariate time series for "JNWEND DONE" log format becomes different from the historical one, then this is an indication of the counting of "JNWEND DONE" log format is not corresponding to the one for "JNWSTART". Therefore, this type of system anomaly implies that some jobs are either lost or not finished.

Figure 4:
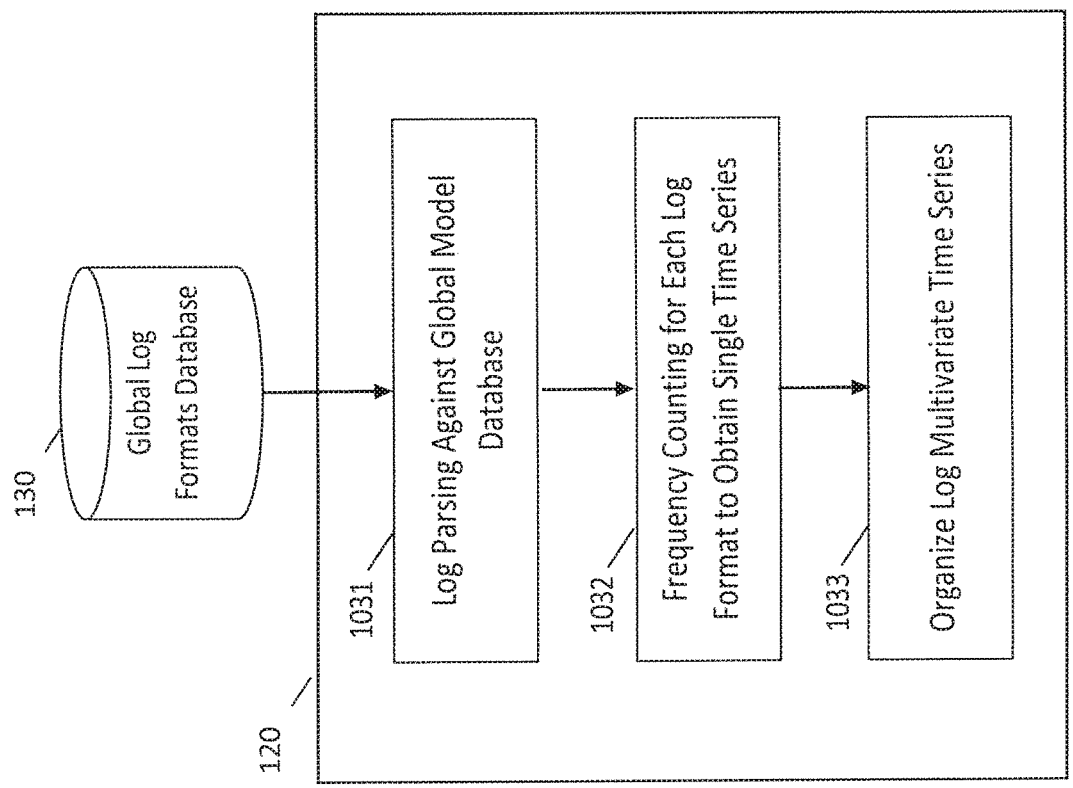
FIG. 4 is a block diagram illustrating a component for multivariate log time series for log retrieval, in accordance with the present invention.

Referring now back to FIG. 1, multivariate log time series extractions (component) 120 extracts the time dynamics information of each log format and forms multivariate time series for each set of historical logs. As illustrated in FIG. 2, the log formats often contain a time stamp field in which log messages record when events occur. Therefore, for each log format, the log retrieval architecture 100 can determine (for example, account for, calculate, etc.) the frequency of occurrence within a fixed time (for example a predetermined time window). The log retrieval architecture 100 sets this frequency of occurrence as the time series for this log format. The log retrieval architecture 100 applies the same procedure to all distinct log formats within a selected set of historical logs and thereby generates multivariate time series to represent the log system dynamics. FIG. 4, described in detail herein below, shows the details of multivariate log time series extractions (component) 120.

Log signature database 125 stores the output of multivariate log time series extractions 120. The output of multivariate log time series extractions 120 becomes the signature for each set of training historical logs. The multivariate log format time series represent the dynamics of the log generating systems. The results will be stored in the log signature database 125, which is the database for storing and indexing the log signature feature vectors for the entire historical logs. According to an example embodiment, a NoSQL database, such as is implemented as the storage mechanism of log signature database 125. Each item or entry in the NoSQL database is a key-value pair. The key is the index of historical log sets and the value is the corresponding joint syntactic and semantic feature vector. The log signature database 125 is used during query stage to retrieve the feature vectors for similarity computation.

Global log formats database 130 is the database for organizing the global log formats and stores the output of adaptive log formats learning (component) 115. Because each log format is a regular expression, adaptive log formats learning (component) 115 uses one single database 130. Database 130 will be updated continuously throughout the procedure by adaptive log formats learning 115. Each item or entry in the global log formats database 130 is a key-value pair. The key is the log format global ID, and the value is the regular expression strings. The global log formats database 130 serves as an intermediate between learning and query stages. All required models after learning stages are stored in the global log formats database 130.

The anomaly retrieval stage 200 retrieves and detects anomalies. The anomaly retrieval stage 200 is the retrieval phase that is implemented when a set of query logs is input to the invention for retrieving the most similar set of historical logs. To achieve this goal, anomaly retrieval stage 200 (constructs and) implements multiple components and uses the outputs from learning stage 105 in log signature database 125 and global log formats database 130. The anomaly retrieval stage 200 includes a (for example, one) set of query logs 201, a query log parsing against model database 202, a multivariate log time series extractions (component) 203, a multi-leg similarity distance computation, ranking and retrieval (component) 204, a system anomaly detection (component) 205 and an update model databases (component) 206.

The set of query logs 201 is in a same format as the historical logs in multiple sets of historical logs 110. The origin of the query logs 201 can be generated from the same system as the one in the learning stage 105. According to an example embodiment, an application scenario includes retrieving similar day of logs in response to receiving a day of query logs. The similarity between two sets of logs is represented by the cosine distance, defined herein below with respect to FIG. 8, between two multivariate time series. According to another example embodiment, the query log can be obtained from different system instance than the one in the learning stage 105. For example, two copies of the same software application(s) can execute in different sites with overlapping semantic information. The purpose of retrieval in this instance is to find any similarity between two execution instances. The heterogeneous logs are transported into the query stage (e.g., anomaly retrieval stage 200) in the same manner as in the learning stage 105.

Figure 7:
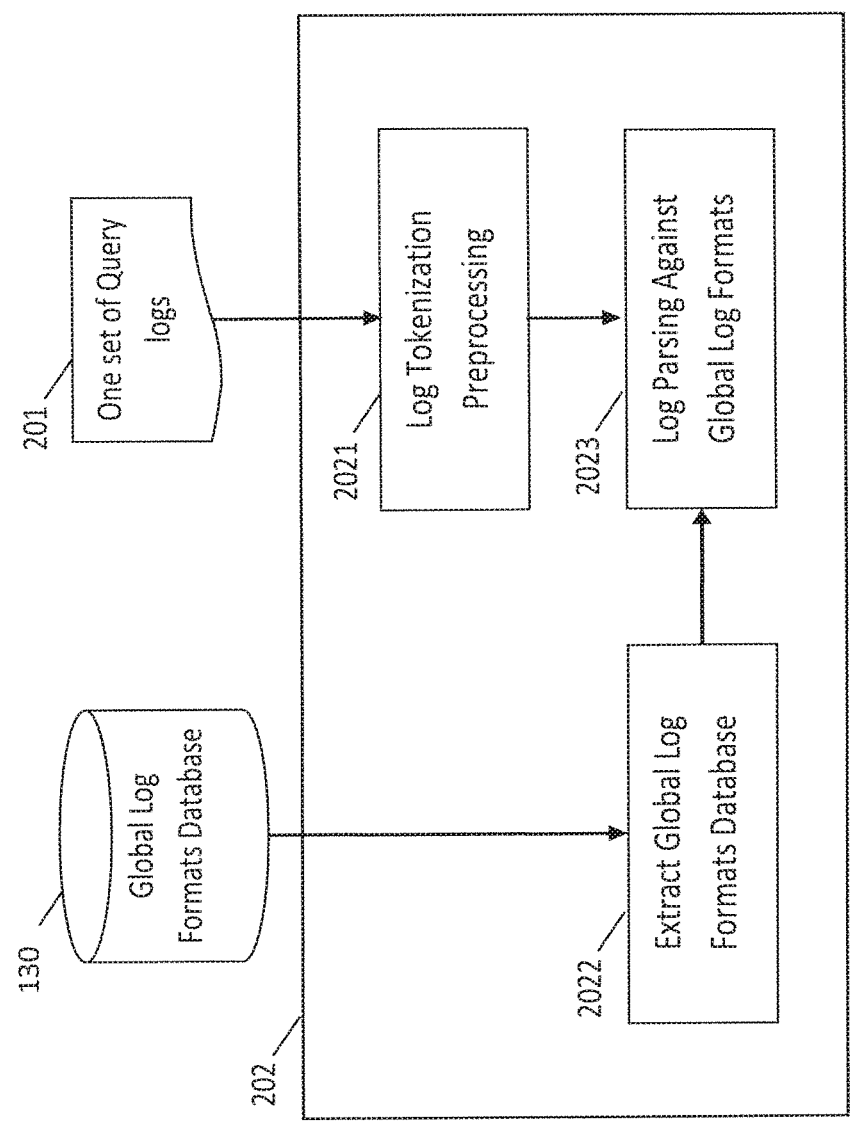
FIG. 7 is a block diagram illustrating a component for query log parsing against model database, in accordance with the present invention.

Query log parsing against model database component 202 parses the query log based on the output of the global log formats database 130 generated at the learning stage 105. FIG. 7, described further in detail herein below, illustrates additional components of query log parsing against model database component 202.

Referring now back to FIG. 1, multivariate log time series extractions (component) 203 is a similar component to multivariate log time series extractions (component) 120. Multivariate log time series extractions (component) 203 produces the multivariate log time series for the query logs (that are being analyzed).

Figure 8:
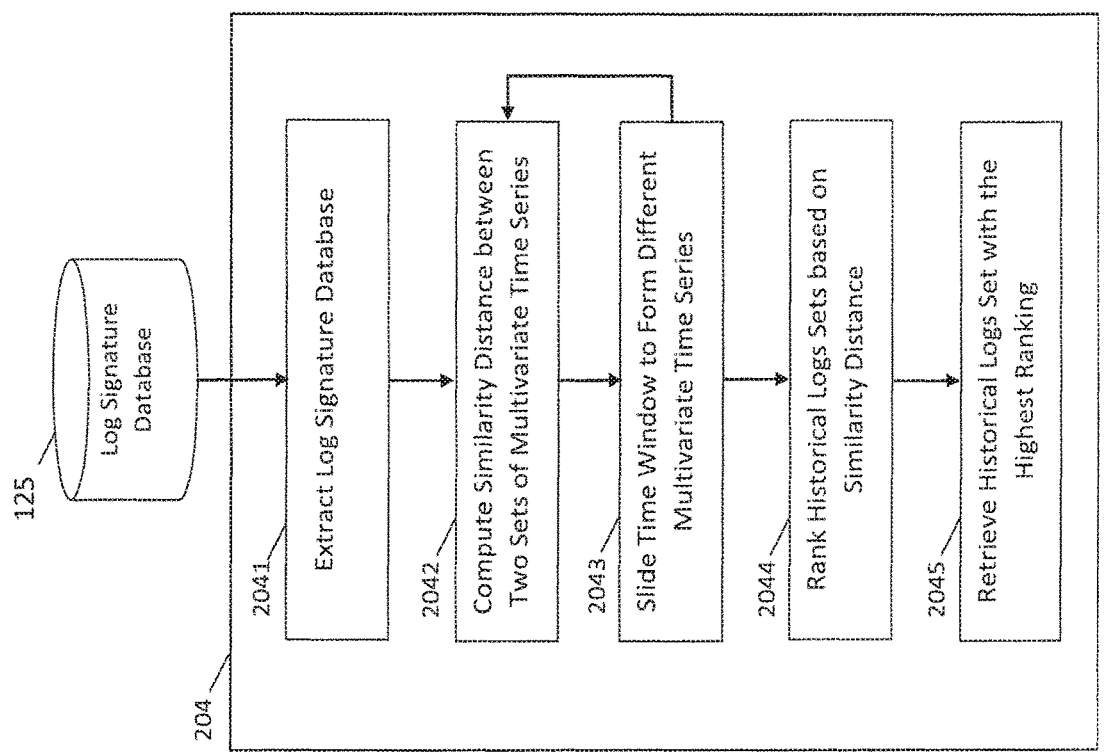
FIG. 8 is a block diagram illustrating a component for multi-leg similarity distance computation, ranking and retrieval, in accordance with the present invention.

Multi-leg similarity distance computation, ranking and retrieval (component) 204 is a core part of the query log retrieval. Multi-leg similarity distance computation, ranking and retrieval (component) 204 computes the similarity distance between two sets of multivariate time series between query logs and training historical logs in a multi-leg sliding window approach. Multi-leg similarity distance computation, ranking and retrieval (component) 204 then ranks all training logs based on the similarity distances and retrieves the one with the highest ranking. FIG. 8, described in detail herein below, illustrates different subcomponents within the multi-leg similarity distance computation, ranking and retrieval (component) 204.

System anomaly detection (component) 205 detects system anomalies. A system anomaly is defined as a deviation of query log away from the normal system operation status. If the query logs deviate away from the most similar logs retrieved from the historical log database, then the query logs deviate farther away from the rest of the historical normal logs. Therefore, system anomaly detection (component) 205 determines the query logs as anomalous based on the distance measure between the query logs and the retrieved most similar logs. The similarity measure is further defined herein below with respect to FIG. 8, and more particularly, in component 2042.

Update model databases (component) 206 updates model databases. The log retrieval is a continuous process that requires updating the model databases with the query logs. Update model databases (component) 206 includes subcomponents as described herein below with respect to FIG. 9.

Figure 3:
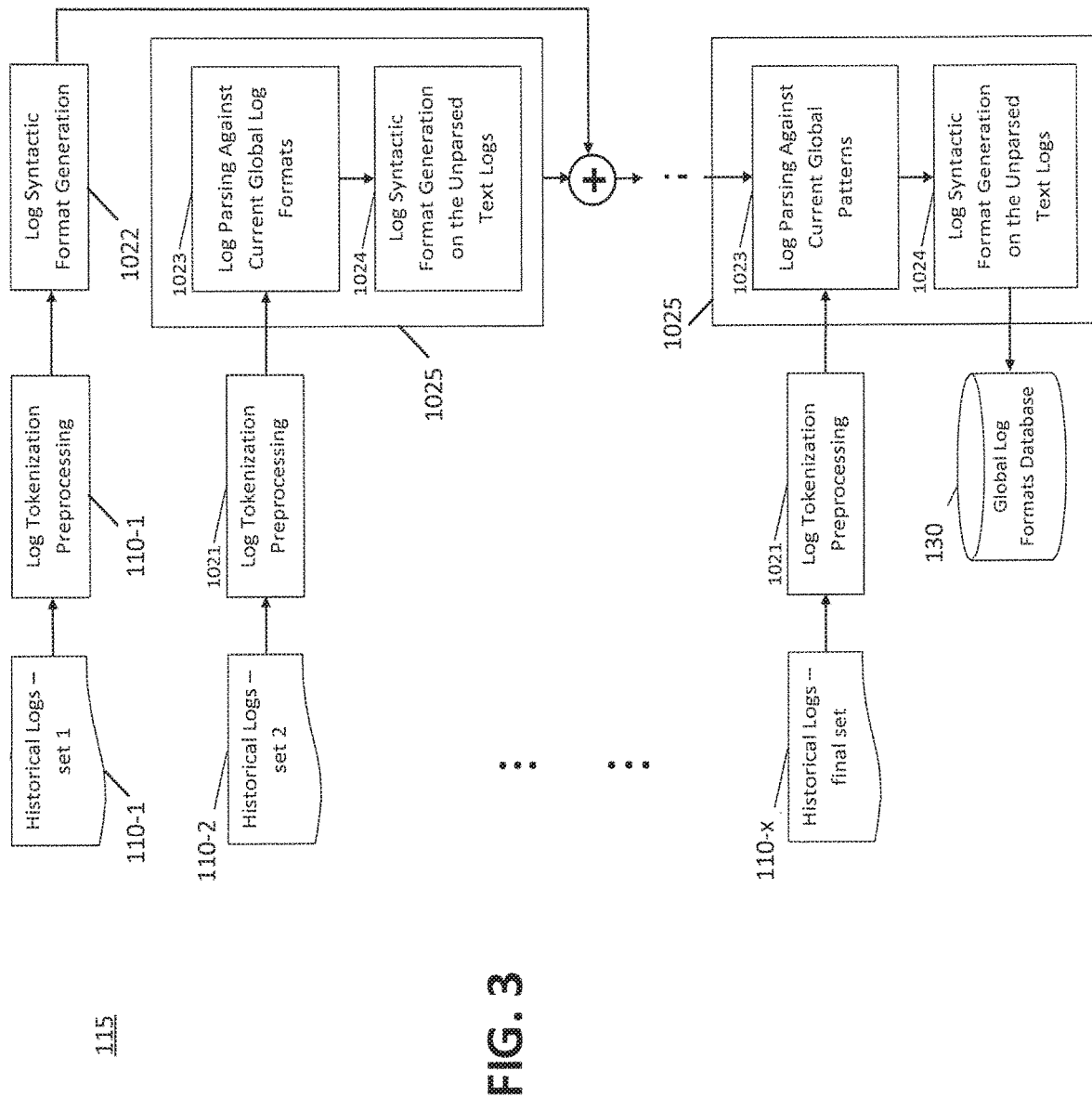
FIG. 3 is a block diagram illustrating a component for adaptive log formats learning for each variable field, in accordance with the present invention.

Referring now to FIG. 3, a block diagram illustrating implementation of adaptive log formats learning (component) 115 for adaptive log formats learning for each variable field is shown.

When a set of query logs are compared to the historical logs, a common log format dictionary is required to perform a comparison. In some instances, common log formats exist in multiple sets of historical logs. For example, a job scheduling system records same log formats of job status with different job IDs in consecutive days. Therefore, to aggregate all log syntactic formats without redundancy and repetition, log retrieval architecture 100 selects an adaptive learning approach for global log format ID generation purpose. The adaptive log format mining process continuously learns, modifies, synchronizes and aggregates a global log syntactic format dictionary with the latest historical logs. The process does not reproduce a new set of log formats from scratch every time a new set of historical logs is available. Rather log retrieval architecture 100 first parses the new set of text logs with the previous learned log format dictionary based on regular expression matching. A regular expression (regex or regexp, also referred to as a rational expression) is a sequence of characters that define a search pattern.

FIG. 3 presents an overview of adaptive log format learning technique implemented by adaptive log formats learning (component) 115 for global log format dictionary generation. Adaptive log formats learning (component) 115 includes multiple composite units including in multiple sets of historical logs 110 (shown as historical logs—set 1 110-1, historical logs—set 2 110-2 to historical logs final set 110-*x* in FIG. 3), log tokenization preprocessing 1021, log parsing against current global log formats 1023 and log syntactic format generation on the unparsed text logs 1024. Each historical log set 110 (110-1 to 110-*x*) represents a set of historical text logs with numbering as {set 1, set 2, set 3, . . . , final set}.

The first set of text log will be directly applied to log tokenization preprocessing 1021 and log syntactic format generation 1022 to obtain an initial set of log syntactic format. The text log then passes through multiple composite units 1025 (for example, multiple iterations of log parsing against current global log formats 1023 and log syntactic format generation on the unparsed text logs 1024) and aggregates the current log formats with the previous logs format to produce a final set of global log format dictionary. Therefore, the adaptive and additive learning approach can produce a global log format dictionary which represents all different log syntactic formats within all the historical logs. At each composite unit, multiple sets of historical logs 110 with set i passes through the log tokenization preprocessing subcomponent 1021 of tokenization reprocessing, and subcomponents (log parsing against current global log formats) 1023 and (log syntactic format generation on the unparsed text logs) 1024. The output of log syntactic format generation on the unparsed text logs 1024 is the new log formats which will be aggregated together with the previous output of composite processing unit into new updated log formats.

Log syntactic format generation 1022 generates log syntactic formats. A fundamental element of heterogeneous text logs is the log syntactic format, or regular expression, which is the generation schema to produce the logs. The log syntactic format creates the structure information out of the unstructured logs. The log syntactic format generation 1022 subcomponent produces log syntactic formats using, for example, an automated unsupervised clustering algorithm. The clustering process aggregates multiple logs with similar structural information into clusters. The similarity measure is defined as the token category similarity. Once the logs are clustered, the log syntactic format generation 1022 component merges all the clustered logs to produce the final regular expression format as the log syntactic formats.

Each merge step leverages the Smith-Waterman algorithm to align log formats. The Smith-Waterman algorithm performs local sequence alignment by comparing segments of all possible lengths and optimizing the similarity measure (rather than analyzing the entire sequence). Initially, a sequential merge process is utilized. After several rounds of merge operations, when sequential merge fails to produce a satisfactory outcome, which is characterized by the tradeoff between the number of final log formats and representation power of each log format, log syntactic format generation 1022 resorts to the classic Unweighted Pair Group Method with Arithmetic Mean (UPGMA) algorithm. A cost function that determines the generality of formats is used to identify the end of pattern recognition procedure once the cost is within certain pre-defined threshold. The log syntactic formats capture the structural information of heterogeneous logs. Each token after log tokenization preprocessing 1021 is treated as a unit and the log is an ordered composition of all tokens. If token units switch order, then log syntactic format generation 1022 will produce different syntactic formats.

Log parsing against current global log formats (subcomponent) 1023 analyzes the new set of tokenized text log through the regular expression matching. The log format is represented by regular expression. Upon receiving a list of existing log formats, log parsing against current global log formats (subcomponent) 1023 matches the new logs against the list of regular expressions. Only those logs which are not matched to any of existing log formats will be the output to the log syntactic format generation on the unparsed text logs (subcomponent) 1024 for learning new log formats.

The log retrieval architecture 100 parses new set of tokenized logs given the existing log format models using a general log parsing engine (for example, Logstash). Logstash is an open source software package which is a general log parsing engine. In response to receiving a regular expression as the log pattern model, Logstash parses the input log. Any input log will be either matched to any of the existing log formats (regular expressions), or not matched at all. The unmatched logs will be formed as the input to the log syntactic format generation on the unparsed text logs 1024 for learning new log format models.

Log syntactic format generation on the unparsed text logs 1024 includes a similar functionality to that of log syntactic format generation 1022. Log syntactic format generation on the unparsed text logs 1024 applies the unsupervised clustering process and pattern recognition on the unparsed text logs to produce the log formats which do not exist in the aggregation of all previous log formats. The output of log syntactic format generation on the unparsed text logs 1024 will be joined with the previous existing log formats set to form a new set of log formats. This new set of log formats will be the input to the multivariate log time series extractions 120 (as described herein below with respect to FIG. 4) for parsing of the next set of text logs.

Referring now to FIG. 4 is a block diagram illustrating a component for multivariate log time series extractions 120 in accordance with an embodiment of the present invention.

Multivariate log time series extractions 120 extract the time dynamics information of each log format and form multivariate time series for each set of historical logs. Multivariate time series analysis can be applied to model interactions and co-movements among a group of time series variables. Multivariate log time series extractions 120 includes a log parsing against (global) model database (component) 1031, a frequency counting for each log format to obtain single time series (component) 1032, and an organize log multivariate time series (component) 1033.

Log parsing against model database 1031 includes similar functionality to log syntactic format generation on the unparsed text logs (subcomponent) 1024. However, in log parsing against model database 1031, each set of historical logs is parsed against the final global log formats database (component) 130. The parsed results for each log message will contain the global log format ID and content for each variable field.

Frequency counting for each log format to obtain single time series (component) 1032 performs frequency counting for each log format. Each set of training historical logs contains multiple log messages that correspond to one distinct log format. Subcomponent extracts the time stamps for each log message. Users are required to provide a time range which specifies the size of time window (for example, time period) to count the log message frequencies. The time range parameter will be different for different information technology (IT) computing systems. Some systems, for example hardware component monitoring system, can require a larger time range to collect enough log messages to form a time series because the underlying system has slow dynamics. On the other hand, certain cloud computing system require a much smaller time range due to their fast dynamics. A system administrator (for example, automated or human) can provide this parameter to the log retrieval architecture 100 based on their domain expertise.

To form the consecutive time periods given the time range parameter, a starting point is required to be set as a common reference in both learning 105 and query (anomaly retrieval) stages 200. Example embodiments of the log retrieval architecture 100 use 1970-01-01-00:00:00 (Coordinated Universal Time) as the reference starting time point. Each consecutive time ranges will then be organized according to the reference (starting time) point. This common reference starting point can conveniently be synchronized across learning 105 and query (anomaly retrieval) stages 200. For each time window (or period), frequency counting for each log format to obtain single time series (component) 1032 will count the number of log messages appear in that range for each log format. When frequency counting for each log format to obtain single time series (component) 1032 finishes the counting process for all the time ranges, a single time series will be generated.

Figure 5:
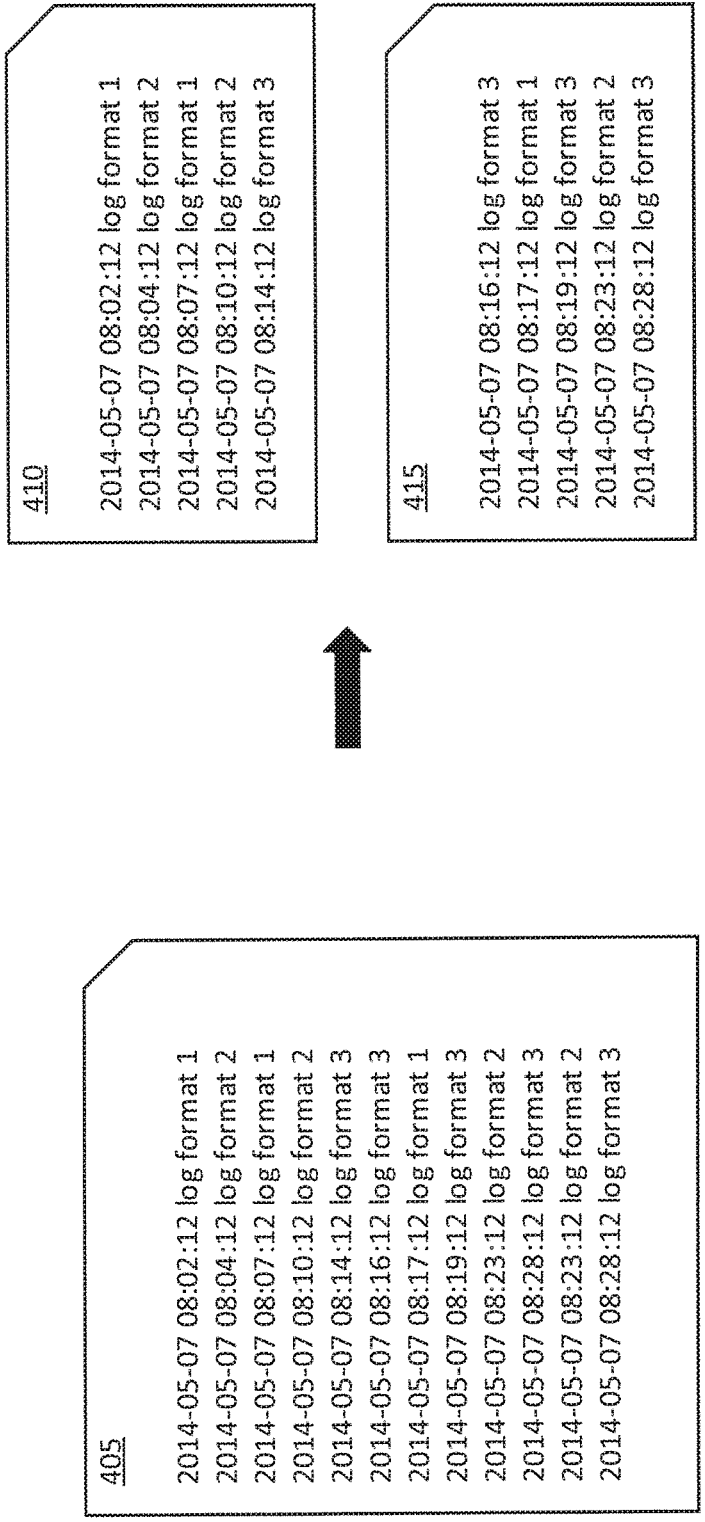
FIG. 5 is a block diagram illustrating frequency counting for each log format to obtain single time series, in accordance with the present invention.
Figure 6:
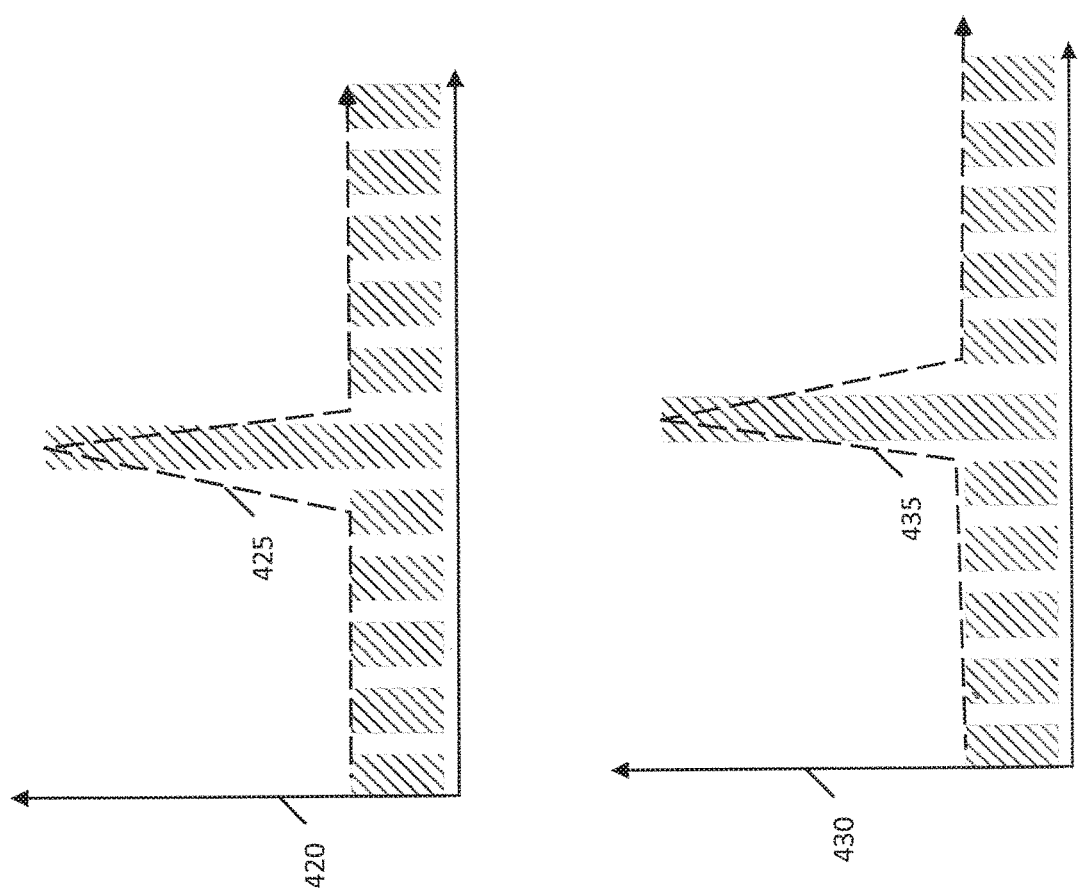
FIG. 6 is a block diagram illustrating frequency counting for each log format to obtain single time series, in accordance with the present invention.

FIGS. 5 and 6 provide an example schematic illustration of different steps in the frequency counting for each log format to obtain single time series 1032. At step 1 (405) in FIG. 5, frequency counting for each log format to obtain single time series 1032 converts the log messages with log format IDs into different segments with the organization of consecutive time periods. As shown, the log messages include a time and log format (for example, 2014-05-07 08:02:12 log format 1, etc.). The original logs with matched log format IDs are accessed. Then at step 2 (410 and 415) frequency counting for each log format to obtain single time series 1032 converts the log messages counts into a single time series for each log format (as shown, for example in FIG. 6, log formats 420 and 430 with time series 425 and 435, respectively) (by performing log counting in the time period).

Organize log multivariate time series component 1033 repeats the procedures of subcomponents 1031 and 1032 for each log format and entire set of training historical logs. After the process is completed, the final multiple sets of multivariate log format time series for each training logs set is produced to represent that particular set of logs.

Referring now to FIG. 7, a block diagram illustrating a component for query log parsing against model database 202 is depicted in accordance with an embodiment of the present invention.

Query log parsing against model database component 202 parses each query log based on the global log formats database 130 which stores the global log formats generated from the learning stage 105. Query log parsing against model database component 202 includes log tokenization preprocessing 2021, extract global log formats database 2022, and log parsing against global log formats 2023.

Log tokenization preprocessing 2021 includes similar functionality as the log tokenization preprocessing subcomponent 1021. Log tokenization preprocessing 2021 applies the same set of rules and criteria for tokenization of query logs 201.

Extract global log formats database (subcomponent) 2022 queries the global log formats database 130. If a global log formats table does not exist in the relevant database (e.g., global log formats database 130 is not available), then extract global log formats database (subcomponent) 2022 exits the workflow and returns an error message to the user to inform the user that global log formats database 130 is not available and instructs users to execute learning stage 105 first. If the global log formats table exists in the database 130, extract global log formats database (subcomponent) 2022 extracts entire log formats with IDs and corresponding regular expressions and writes the global log formats into a file for the subsequent processing.

Log parsing against global log formats 2023 includes similar functionality to log syntactic format generation on the unparsed text logs (subcomponent) 1024. The parsed results for each log message will contain the global log format ID and content for each variable field.

Referring now to FIG. 8, a block diagram illustrating a multi-leg similarity distance computation, ranking and retrieval (component) 204 is depicted in accordance with an embodiment of the present invention.

Multi-leg similarity distance computation, ranking and retrieval (component) 204 includes extract log signature database (component) 2041, compute similarity distance between two sets of multivariate time series (component) 2042, slide time window to form different multivariate time series (component) 2043, rank historical logs sets based on similarity distance (component) 2044, and retrieve historical logs set with the highest ranking (component) 2045.

Extract log signature database (component) 2041 queries log signature database 125. If the log signature table does not exist in the database (for example, log signature database 125 is not available), then extract log signature database 2041 exits the workflow and returns an error message to the user to inform the user that log signature database 125 is not available. Extract log signature database 2041 instructs users to execute learning stage 105 first in this instance. If the log signature table exists in the database 125, extract log signature database 2041 extracts the entire log signature from the multivariate log format time series database 125 with log format IDs and their corresponding time series and writes the log signature into a file for the subsequent processing.

Compute similarity distance between two sets of multivariate time series (component) 2042 calculates the similarity distance between the query log multivariate time series and (every) historical log multivariate time series (stored in the database 125). Because the multivariate time series is represented by the term frequencies for each log format, therefore compute similarity distance between two sets of multivariate time series 2042 uses cosine distance to measure the similarity between two single-variate time series with the same log format IDs. Where two single-variate time series of attributes, A and B, the cosine similarity, $\cos(\theta)$, is represented using a dot product and magnitude as $$\cos(\theta) = \frac{A \cdot B}{\|A\| \|B\|} = \frac{\sum_{i=1}^{n} A_i B_i}{\sqrt{\sum_{i=1}^{n} A_i^2} \sqrt{\sum_{i=1}^{n} B_i^2}},$$

where each $A_i$ and $B_i$ are the term frequencies of log message counts within a particular time period.

Because term frequencies are positive numbers, therefore, the value of $\cos(\theta)$ ranges between 0 and 1 with 0 being least similar and 1 being identical. Component 2042 repeats this procedure for every available pair of time series with the same log format IDs. If there are some log formats only existing in one set of logs, then the $\cos(\theta)$ will be zero. Then the final similarity score will be summation of all similarity distances divided by the total number of distinct log formats between any two sets of multivariate time series. The compute similarity distance between two sets of multivariate time series component 2042 will compute similarity for each historical log set against the query log multivariate time series.

Slide time window to form different multivariate time series (component) 2043 adjusts for the similarity of log messages at different execution times. Because IT systems can generate similar log messages at different execution time, therefore in some instances two sets of otherwise similar multivariate time series differ in terms of the time partitions of the log message counts and result in a low similarity score. Slide time window to form different multivariate time series (component) 2043 generates a different set of multivariate time series by sliding the time partition window one by one until the component 2043 reaches the limit of the time range parameter. Each variation of multivariate time series will be used to compute the similarity distance again with the corresponding multivariate log format time series from training historical logs. This can be referred to as a multi-leg similarity distance computation. Subcomponent 2043 connects to compute similarity distance between two sets of multivariate time series component 2042 through a loop structure and the workflow completes (continues) until the sliding time window reaches the last time stamp of the original time partition.

Rank historical logs sets based on similarity distance (component) 2044 executes two steps. The first step is to use the most similar distance score from the multiple similarity distances obtained from slid(ing) time window to form different multivariate time series 2043, which represents the similarity between the two multivariate log format time series from query logs and a selected historical training log(s). This step also provides the specific time window leg that generates the highest similarity distance. Rank historical logs sets based on similarity distance 2044 applies the same procedure to the entire (set of) historical training logs. Rank historical logs sets based on similarity distance 2044 performs a second step of sorting and ranking all similarity distances obtained from the first step.

Retrieve historical logs set with the highest ranking (component) 2045 retrieves the historical logs set with the highest ranking in similarity distance scores as the final result. This set of historical logs is the one most similar to the query logs in terms of log format time series. An index value which denotes the retrieved historical logs set will be sent to the user.

Figure 9:
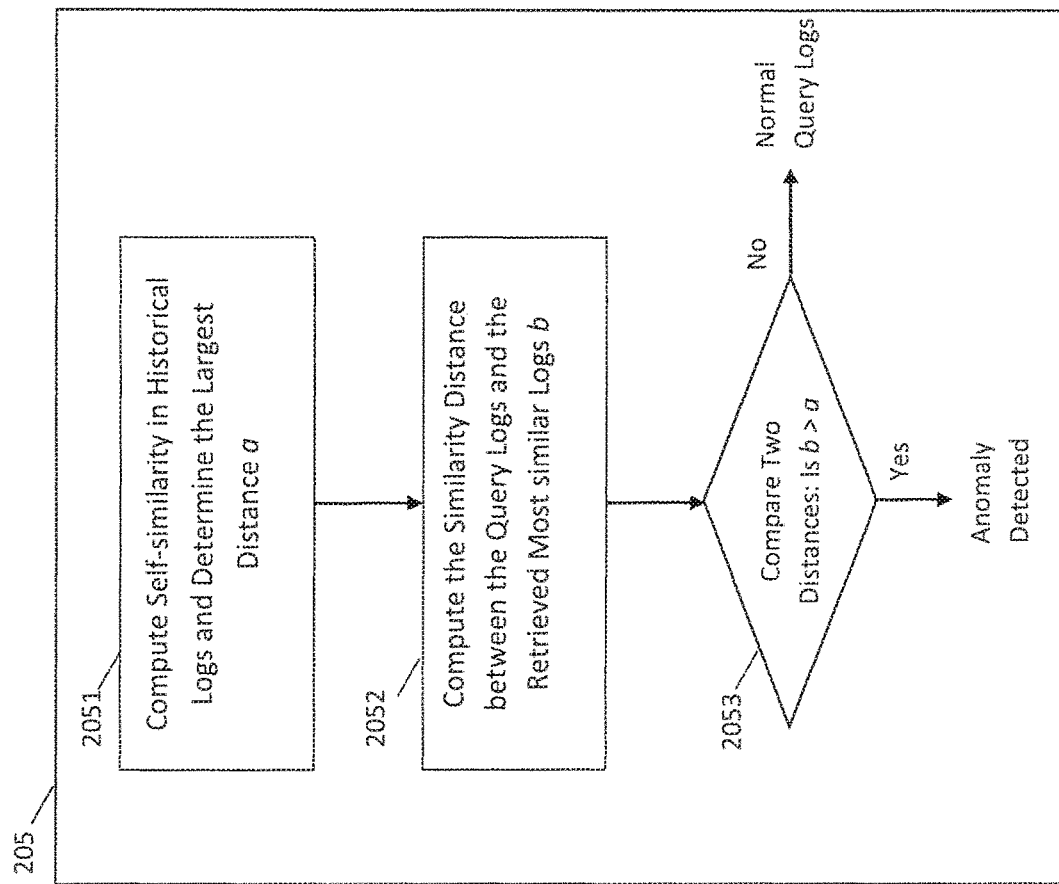
FIG. 9 is a block diagram illustrating system anomaly detection, in accordance with the present invention.

Referring now to FIG. 9 a block diagram illustrating a component for system anomaly detection 205 is depicted in accordance with an embodiment of the present invention.

System anomaly detection 205 includes compute self-similarity in historical logs and determine the largest distance a. (component) 2051, compute the similarity distance between the query logs and the retrieved most similar logs b. (component) 2052, and compare two distances: Is b>a. (component) 2053.

Compute self-similarity in historical logs and determine the largest distance a. (component) 2051 finds the threshold that is used by compare two distances: Is b>a. (component) 2052 (described herein below). In response to receiving the historical logs which are collected during system normal operation, subcomponent 2051 calculates the similarity distance among many different segments according to the cosine similarity, $\cos(\theta)$, defined by compute similarity distance between two sets of multivariate time series component 2042. After compute self-similarity in historical logs and determine the largest distance a. (component) 2051 obtains a list of similarity distances, the maximum value is determined. The maximum value represents the largest dissimilarity among the normal historical logs. When the system operates in normal condition and there are no system anomalies.

Compute the similarity distance between the query logs and the retrieved most similar logs b. (component) 2052 calculates the distance between the query logs and the retrieved most similar logs obtained by multi-leg similarity distance computation, ranking and retrieval (component) 204 based on the cosine similarity defined by compute similarity distance between two sets of multivariate time series component 2042.

Compare two distances: Is b>a. (component) 2053 detects anomalies based on the comparing the two distances a and b obtained from subcomponents 2051 and 2052. If the distance between the query logs and the retrieved most similar logs is greater than the maximum value of self-similarity distance among normal historical logs (2053, yes), then a system anomaly is detected, otherwise (2053, no) the query logs are normal logs. The log retrieval architecture 100 uses the distance-based criterion to determine system anomalies.

Figure 10:
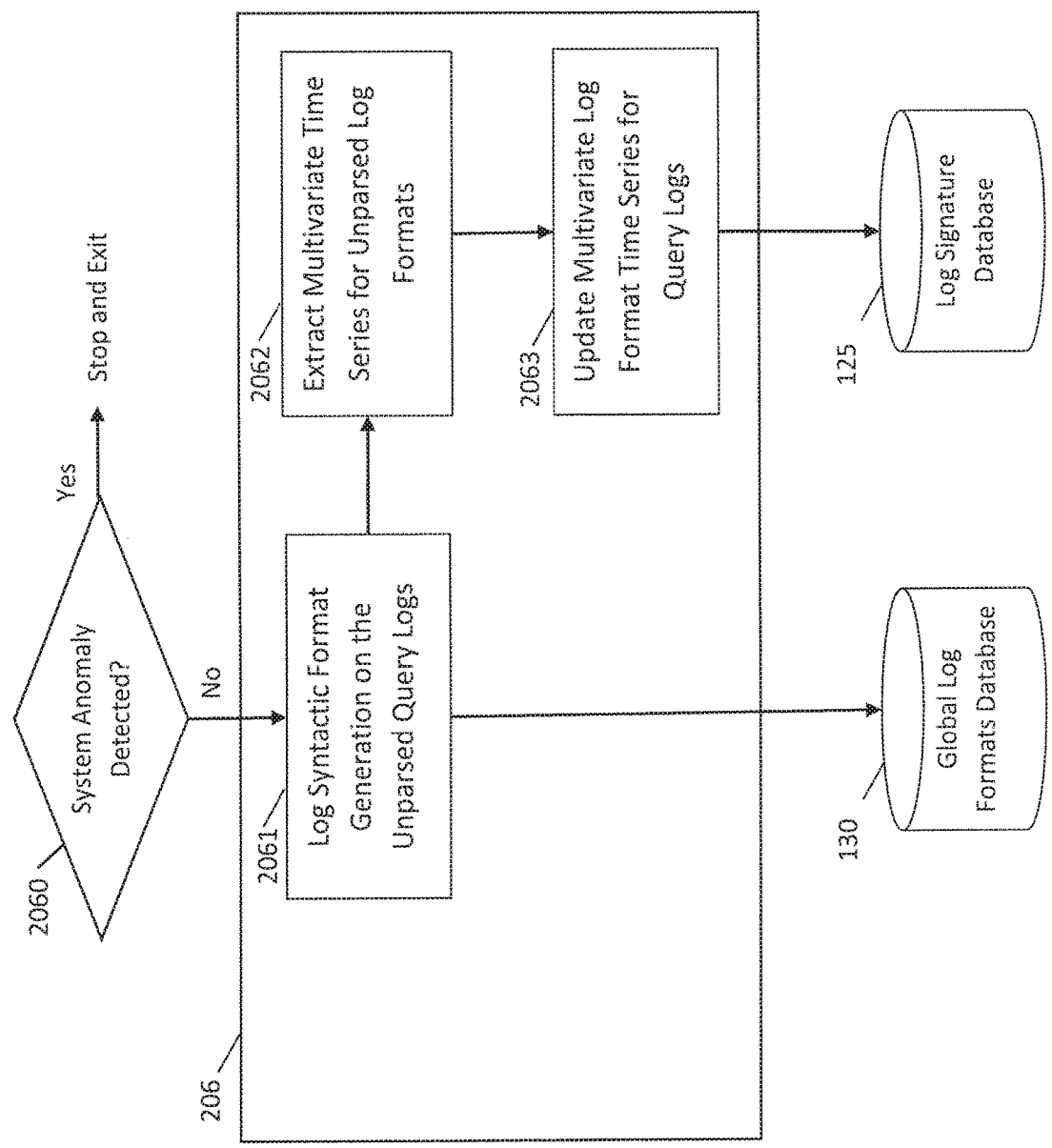
FIG. 10 is a block diagram illustrating a component for updating model databases, in accordance with the present invention.

Referring now to FIG. 10, a block diagram illustrating a component for update model databases 206 is depicted in accordance with an embodiment of the present invention.

Update model databases (component) 206 includes log syntactic format generation on the unparsed query logs (component) 2061, extract multivariate time series for unparsed log formats (component) 2062, and update multivariate log format time series for query logs (component) 2063.

In instances in which a system anomaly is detected (2060, yes), the system stops and exits this process. In instances in which a system anomaly is not detected (2060, no), the logs are input to update model databases 206.

Log syntactic format generation on the unparsed query logs (component) 2061 generates log formats for unparsed query logs to update the global log formats database 130 because the global log formats database 130 does not contain these new log formats. The technique implemented by log syntactic format generation on the unparsed query logs 2061 uses a similar procedure to that executed by log syntactic format generation on the unparsed text logs (subcomponent) 1024. The output of log syntactic format generation on the unparsed query logs 2061 is stored in the updated global log formats database 130.

Extract multivariate time series for unparsed log formats (component) 2062, to update the log signature database 125, first extracts the multivariate time series for those new log formats obtained from log syntactic format generation on the unparsed query logs 2061. Extract multivariate time series for unparsed log formats (component) 2062 implements a similar technique to that used by multivariate log time series extractions (component) 120.

Update multivariate log format time series for query logs (component) 2063 combines the outputs from extract multivariate time series for unparsed log formats (component) 2062 and 203 as the updated representation of the query log and stores it in the component 104 log signature database. The updated log signature database contains the original historical logs and the query logs. In the next round of application of the log retrieval architecture 100 for a new set of query logs retrieval, the current query logs become one set of historical training logs.

Figure 11:
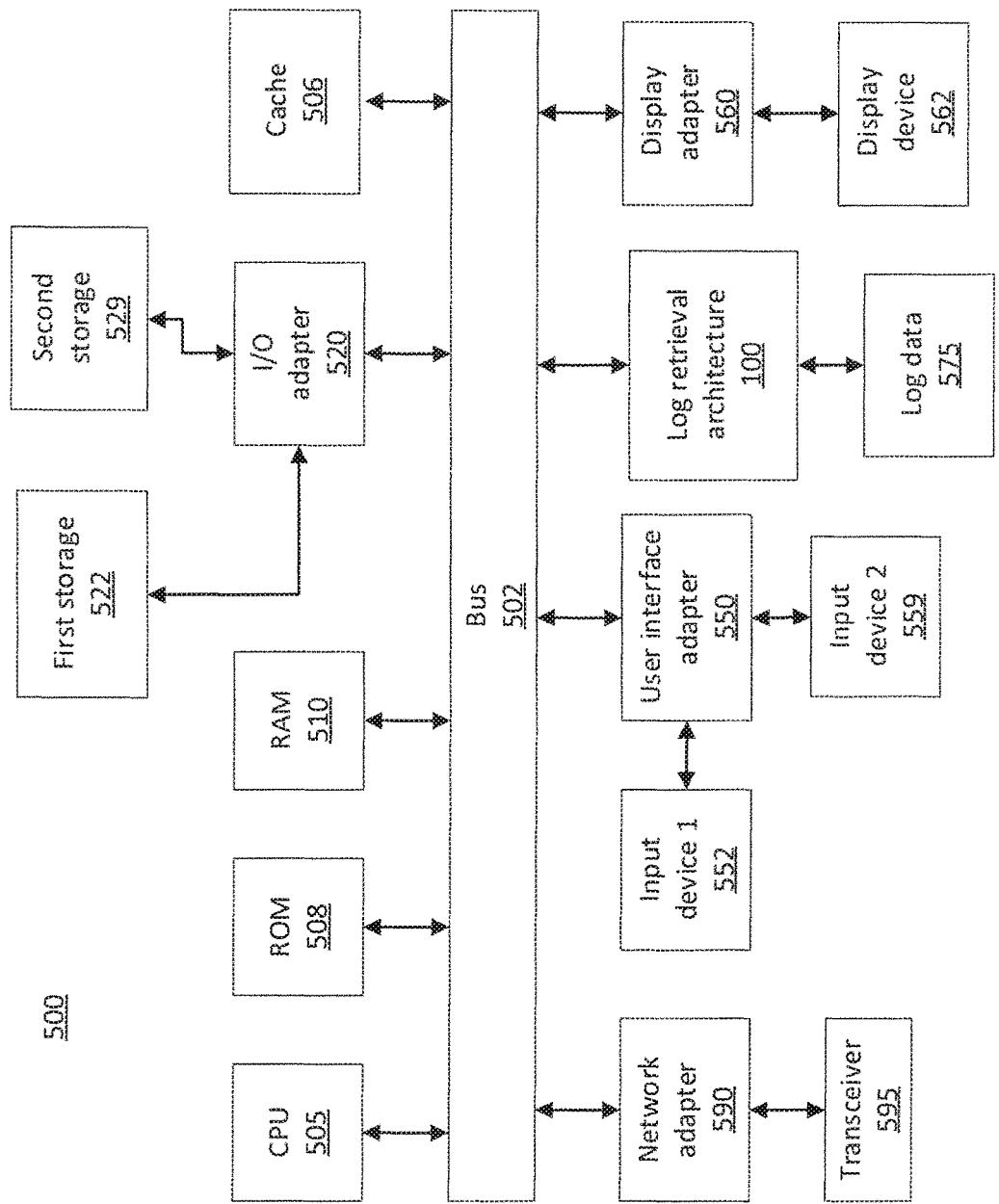
FIG. 11 is a schematic and block diagram illustrating a high-level system for computer log retrieval based on multivariate log time series and system analogy detection, in accordance with an embodiment of the present invention.

Referring now to FIG. 11, an exemplary computer system (e.g., a server or a network device) for system anomaly detection based on retrieving a set of most similar logs is shown in accordance with an embodiment of the present invention. The computer system 500 includes at least one processing device (CPU) 505 operatively coupled to other components via a system bus 502. A cache 506, a Read Only Memory (ROM) 508, a Random-Access Memory (RAM) 510, an input/output (I/O) adapter 520, a network adapter 590, a user interface adapter 550, a log retrieval architecture 100 and a display adapter 560, can be operatively coupled to the system bus 502.

A first storage device 522 and a second storage device 529 can be operatively coupled to system bus 502 by the I/O adapter 520. The storage devices 522 and 529 can be any of a disk storage device (e.g., a magnetic or optical disk storage device), a solid state magnetic device, and so forth. The storage devices 522 and 529 can be the same type of storage device or different types of storage devices. Either or both of the storage devices 522 and 529 can be configured to operate as a data store or database to store various logs of system events (e.g., heterogeneous logs). Log retrieval architecture 100 can include software and/or hardware as described herein.

A transceiver 595 can be operatively coupled to system bus 502 by network adapter 590. A display device 562 is operatively coupled to system bus 502 by display adapter 560. Log data 575 can be operatively coupled to system bus 502 directly or indirectly, for example via log retrieval architecture 100. Log retrieval architecture 100 can be configured for system anomaly detection by retrieving a set of most similar logs from a historical database based on a set of query logs (e.g., via log data 575).

A first user input device 552 and a second user input device 559 can be operatively coupled to system bus 502 by user interface adapter 550. The user input devices 552 and 559 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used in accordance with the present invention. The user input devices 552 and 559 can be the same type of user input device or different types of user input devices. The user input devices 552 and 559 can be used to input and output information to and from system 500.

Other embodiments of the present invention can optionally include further processing units including a graphics processing unit ("GPU"), a mother board, or alternatively/additionally another storage medium, an operating system, one or more application software, as well as including one or more communication interfaces (e.g., RS232, Ethernet, Wi-Fi, Bluetooth, USB). Useful examples of computing devices optionally included in or integrable with embodiments of the present invention include, but are not limited to, personal computers, smart phones, laptops, mobile computing devices, tablet PCs, and servers. In accordance with embodiments of the present invention, an event record log source can be a computer storage medium.

Of course, the computer system 500 can also include other elements (not shown), as readily contemplated by one of skill in the art, as well as omit certain elements. For example, various other input devices and/or output devices can be included in computer system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 500 are readily contemplated by one of ordinary skill in the art given the teachings of the present invention provided herein.

It should be understood that multiple computing devices can be operably linked to form a computer network in a manner as to distribute and share one or more resources, such as clustered computing devices and server banks/farms. In embodiments of the present invention each of the aforementioned elements (e.g., device, medium, source, or module) can be directly or indirectly communicably connected (e.g., via a wireless a wired electronic connection) to at least one other element of the system. As described in more detail below, some embodiments of the present invention can be wholly contained within a single computing device. Other embodiments however, can encompass a plurality of interconnected or networked devices and resources.

Figure 12:
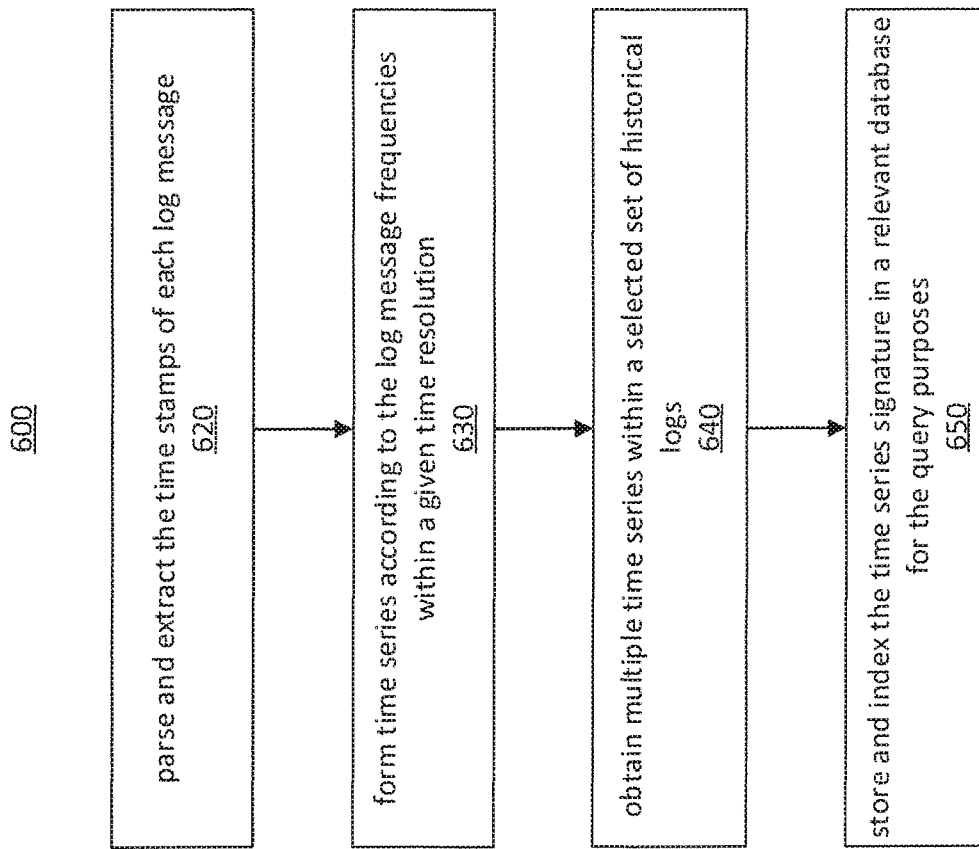
FIG. 12 is a flow diagram illustrating a method for computer log retrieval based on multivariate log time series, in accordance with the present invention.

Referring now to FIG. 12, a method 600 for system anomaly detection based on retrieving a set of most similar logs is illustratively depicted in accordance with an embodiment of the present invention.

At block 610, log retrieval architecture 100 extracts multivariate time series for each log format within each set of historical logs. Each log template corresponds to one log generating regular expression which will be mapped to multiple log messages.

At block 620, log retrieval architecture 100 parses and extracts the time stamps of each log message.

At block 630, log retrieval architecture 100 forms time series according to the log message frequencies within an identified (for example, a given, selected, etc.) time resolution. Each log template generates a time series. For example, log retrieval architecture 100 can frequency count for each log format of the set of logs to obtain single time series for each log format.

At block 640, log retrieval architecture 100 obtains multiple time series within a selected set of historical logs. Therefore, the multi-variate time series captures the log system dynamics and become the signature of the text logs.

At block 650, log retrieval architecture 100 stores and indexes the time series signature in a relevant database for the query purposes. The time series can be stored in a format that is accessible for query purposes.

Figure 13:
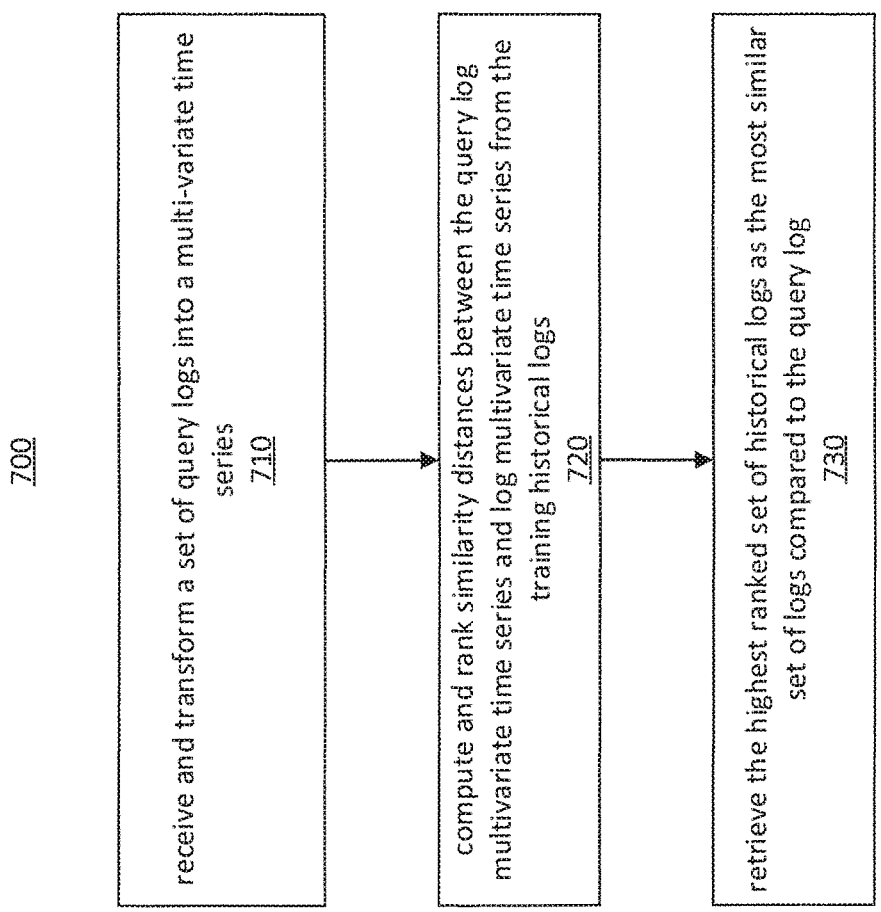
FIG. 13 is a flow diagram illustrating a method for system analogy detection, in accordance with the present invention.

Referring now to FIG. 13, a method 700 for system anomaly detection based on retrieving a set of most similar logs is illustratively depicted in accordance with an embodiment of the present invention.

At block 710, log retrieval architecture 100 receives and transforms a set of query logs into a multi-variate time series, for example, in a similar manner as for training historical logs as described herein above, for example with respect to adaptive log formats learning (component) 115.

At block 720, log retrieval architecture 100 computes and ranks similarity distances between the query log multivariate time series and ones (for example, log multivariate time series) from the training historical logs.

At block 730, log retrieval architecture 100 retrieves the highest ranked set of historical logs as the most similar set of logs compared to the query log.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for computer log retrieval, comprising:
parsing, by a processor device, each log of a set of logs, and comparing each log against a model database, wherein parsing includes applying a clustering process and pattern recognition to unparsed logs from the set of logs to produce new log formats;
frequency counting each of one or more log formats of the set of logs to obtain single time series;
forming a multivariate time series from the single time series according to log message frequencies within a selected time resolution for each log format in the set of logs;
obtaining a time series signature for the set of logs based on the multivariate time series; and
storing and indexing the time series signature in the model database in a query accessible format.

2. The method as recited in claim 1, wherein the new log formats include log formats that do not exist in an aggregation of all previous log formats.

3. The method as recited in claim 1, wherein frequency counting for each log format of the set of logs to obtain single time series further comprises:
counting a number of log messages in each of a plurality of time ranges for each log format; and
generating the single time series based on the number of log messages in each of the plurality of time ranges.

4. The method as recited in claim 1, wherein frequency counting further comprises:
setting a starting point for frequency counting based on a common reference in both a learning stage and a query stage; and
forming consecutive time periods based on a time range parameter and the common reference.

5. The method as recited in claim 1, further comprising:
outputting a final multiple sets of multivariate log format time series for the set of logs to represent the set of logs.

6. The method as recited in claim 1, wherein the multivariate time series includes log system dynamics of the set of logs.

7. The method as recited in claim 1, wherein each of at least one item and each of at least one entry in the database is a key-value pair and wherein a key is an index of the set of logs and a value is a corresponding joint syntactic and semantic feature vector.

8. The method as recited in claim 1, further comprising:
retrieving computer logs based on log system dynamics information of the set of logs.

9. A method for computer log retrieval, comprising:
receiving a set of query logs;
transforming, by a processor device, the set of query logs into a query log multi-variate time series;
accessing log multivariate time series of historical logs;
computing and ranking a similarity distance between the query log multivariate time series and the log multivariate time series of the historical logs;
providing a final similarity score including a summation of all similarity distances divided by a total number of distinct log formats between sets of multivariate time series; and
retrieving a highest ranked set of historical logs, the highest ranked set being a most similar set of logs compared to the set of query logs.

10. The method as recited in claim 9, further comprising:
presenting the retrieved set of logs with extracted statistics.

11. The method as recited in claim 9, wherein accessing the log multivariate time series of the historical logs further comprises:
determining the log multivariate time series of the historical logs.

12. The method as recited in claim 9, further comprising:
ranking the similarity distance based on a cosine similarity.

13. The method as recited in claim 9, further comprising:
extracting an entire log signature multivariate log format time series database with log format identifiers and corresponding time series; and
writing the entire log signature multivariate log format time series database into a file for subsequent processing.

14. The method as recited in claim 9, further comprising:
identifying variables A and B associated with the set of query logs and the historical logs;
determining a cosine similarity, $\cos(\theta)$, using a dot product and magnitude represented as $$\cos(\theta) = \frac{A \cdot B}{\|A\| \|B\|} = \frac{\sum_{i=1}^{n} A_i B_i}{\sqrt{\sum_{i=1}^{n} A_i^2} \sqrt{\sum_{i=1}^{n} B_i^2}},$$

wherein each $A_i$ and $B_i$ are term frequencies of log message counts within a particular time period.

15. The method as recited in claim 9, wherein transforming the set of query logs into the query log multi-variate time series further comprises:
generating the query log multi-variate time series by sliding a time partition window for each of a plurality of time periods to a limit of a time range parameter.

16. The method as recited in claim 9, further comprising:
determining a maximum value of self-similarity of a normal historical log of the set of historical logs; and
detecting an anomaly in response to determining that a value of similarity of the query logs to the set of historical logs is greater than the maximum value of self-similarity.

17. The method as recited in claim 9, wherein the similarity distance is defined as a log formats multivariate time series similarity between sets of logs.

18. A computer system for computer log retrieval, comprising:
a processor device operatively coupled to a memory device, the processor device being configured to:
receive a set of query logs;
transform the set of query logs into a query log multi-variate time series;
access a log multivariate time series of historical logs;
compute and rank a similarity distance between the query log multivariate time series and the log multivariate time series of the historical logs;
provide a final similarity score including a summation of all similarity distances divided by a total number of distinct log formats between sets of multivariate time series; and
retrieve a highest ranked set of historical logs as a most similar set of logs compared to the set of query logs.

* * * * *